US012666070B2

(12) United States Patent
Kang et al.

(10) Patent No.: US 12,666,070 B2
(45) Date of Patent: Jun. 23, 2026

(54) IMAGE DECODING DEVICE USING DIFFERENTIAL CODING

(71) Applicants: Hyundai Motor Company, Seoul (KR); Kia Corporation, Seoul (KR); Ewha University-Industry Collaboration Foundation, Seoul (KR)

(72) Inventors: Je Won Kang, Hwaseong (KR); Sang Hyo Park, Hwaseong (KR); Seung Wook Park, Hwaseong (KR); Wha Pyeong Lim, Hwaseong (KR)

(73) Assignees: Hyundai Motor Company, Seoul (KR); Kia Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 70 days.

(21) Appl. No.: 18/965,555

(22) Filed: Dec. 2, 2024

(65) Prior Publication Data

US 2025/0097449 A1 Mar. 20, 2025

Related U.S. Application Data

(63) Continuation of application No. 17/438,596, filed as application No. PCT/KR2020/095036 on Mar. 13, 2020, now Pat. No. 12,200,239.

(30) Foreign Application Priority Data

Mar. 13, 2019 (KR) ........................ 10-2019-0028995

(51) Int. Cl.
H04N 19/46 (2014.01)
H04N 19/105 (2014.01)
(Continued)

(52) U.S. Cl.
CPC ........... H04N 19/46 (2014.11); H04N 19/105 (2014.11); H04N 19/117 (2014.11);
(Continued)

(58) Field of Classification Search
CPC .... H04N 19/46; H04N 19/105; H04N 19/117; H04N 19/159; H04N 19/176;
(Continued)

(56) References Cited

U.S. PATENT DOCUMENTS

| | | | |
|---|---|---|---|
| 2007/0065026 A1 | 3/2007 | Lee et al. | |
| 2012/0230397 A1 | 9/2012 | Ouedraogo et al. | |

(Continued)

FOREIGN PATENT DOCUMENTS

| | | | |
|---|---|---|---|
| CN | 105493507 A | 4/2016 | |
| CN | 105611292 A | 5/2016 | |

(Continued)

OTHER PUBLICATIONS

Zhao, Yin et al., "CE6: Sub-block transform for inter blocks (CE6.4.1)", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0140-v3, 18 pages.

(Continued)

*Primary Examiner* — Matthew K Kwan
(74) *Attorney, Agent, or Firm* — Fox Rothschild LLP

(57) ABSTRACT

A video decoding method is configured to reconstruct a current block that is encoded using an intra prediction. The method includes decoding, from a bitstream, direction information indicating a direction of differential coding applied to a residual block of the current block, generating the residual block from residual signals by reconstructing and using the information on the residual signals from the bitstream and using the direction information, inversely quantizing the modified residual block, generating a predic- (Continued)

tion block for the current block through intra prediction, and reconstructing the current block by adding the prediction block and the inverse quantized residual block.

10 Claims, 8 Drawing Sheets

(51) Int. Cl.

| | |
|---|---|
| *H04N 19/117* | (2014.01) |
| *H04N 19/159* | (2014.01) |
| *H04N 19/176* | (2014.01) |
| *H04N 19/82* | (2014.01) |

(52) U.S. Cl.
   CPC ......... *H04N 19/159* (2014.11); *H04N 19/176* (2014.11); *H04N 19/82* (2014.11)

(58) Field of Classification Search
   CPC ...... H04N 19/82; H04N 19/12; H04N 19/119; H04N 19/11; H04N 19/13; H04N 19/70; H04N 19/103; H04N 19/186; H04N 19/593
   USPC .................................................... 375/240.26
   See application file for complete search history.

(56) References Cited

U.S. PATENT DOCUMENTS

| | | |
|---|---|---|
| 2014/0362917 A1 | 12/2014 | Joshi et al. |
| 2015/0063454 A1 | 3/2015 | Guo et al. |
| 2015/0146779 A1 | 5/2015 | Bang et al. |
| 2015/0172658 A1 | 6/2015 | Kim et al. |
| 2015/0201213 A1 | 7/2015 | Suzuki et al. |
| 2015/0264376 A1 | 9/2015 | Zou et al. |
| 2016/0088314 A1 | 3/2016 | Song et al. |
| 2016/0227221 A1 | 8/2016 | Lai et al. |
| 2017/0180750 A1 | 6/2017 | Suzuki et al. |
| 2017/0180751 A1 | 6/2017 | Suzuki et al. |
| 2019/0037235 A1 | 1/2019 | Suzuki et al. |
| 2019/0037236 A1 | 1/2019 | Suzuki et al. |
| 2019/0037237 A1 | 1/2019 | Suzuki et al. |
| 2020/0036970 A1 | 1/2020 | Yoo et al. |
| 2020/0329236 A1 | 10/2020 | Yoo et al. |
| 2022/0053184 A1 | 2/2022 | Yoo et al. |
| 2023/0147003 A1 | 5/2023 | Yoo et al. |

FOREIGN PATENT DOCUMENTS

| | | |
|---|---|---|
| KR | 10-2016-0048170 A | 5/2016 |
| RU | 2635064 C2 | 11/2017 |
| RU | 2642810 C1 | 1/2018 |
| WO | 2018/221817 A1 | 12/2018 |

OTHER PUBLICATIONS

Santiago De Luxàn Hernàndez, et al., "CE3: Line-based intra coding mode (Tests 2.1.1 and 2.1.2)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0076, 10 pages.

Russian Federation Federal Service for Intellectual Property Request for Substantive Examination and Search Report for Application No. 2022131250/07(068221), dated Jun. 2, 2023, 14 pages with English translation.

Russian Federation Federal Service for Intellectual Property Request for Substantive Examination and Search Report for Application No. 2022131249/07(068220), dated Jun. 6, 2023, 14 pages with English translation.

Russian Federation Federal Service for Intellectual Property Request for Substantive Examination and Search Report for Application No. 2022131248/07(068219), dated Jun. 2, 2023, 16 pages with English translation.

Russian Federation Federal Service for Intellectual Property Request for Substantive Examination and Search Report for Application No. 2022131245/07(068209), dated Jun. 5, 2023, 14 pages with English translation.

Notification of First Office Action for Chinese Patent Application No. 202080035224X from China National Intellectual Property Administration, dated May 1, 2024, 13 pages.

B. Bross et al., "Versatile Video Coding (Draft 3)", Joint Video Experts team (JVET), 12th Meeting: Macao, CN, Oct. 3-12, 2018.

(A)                (B)

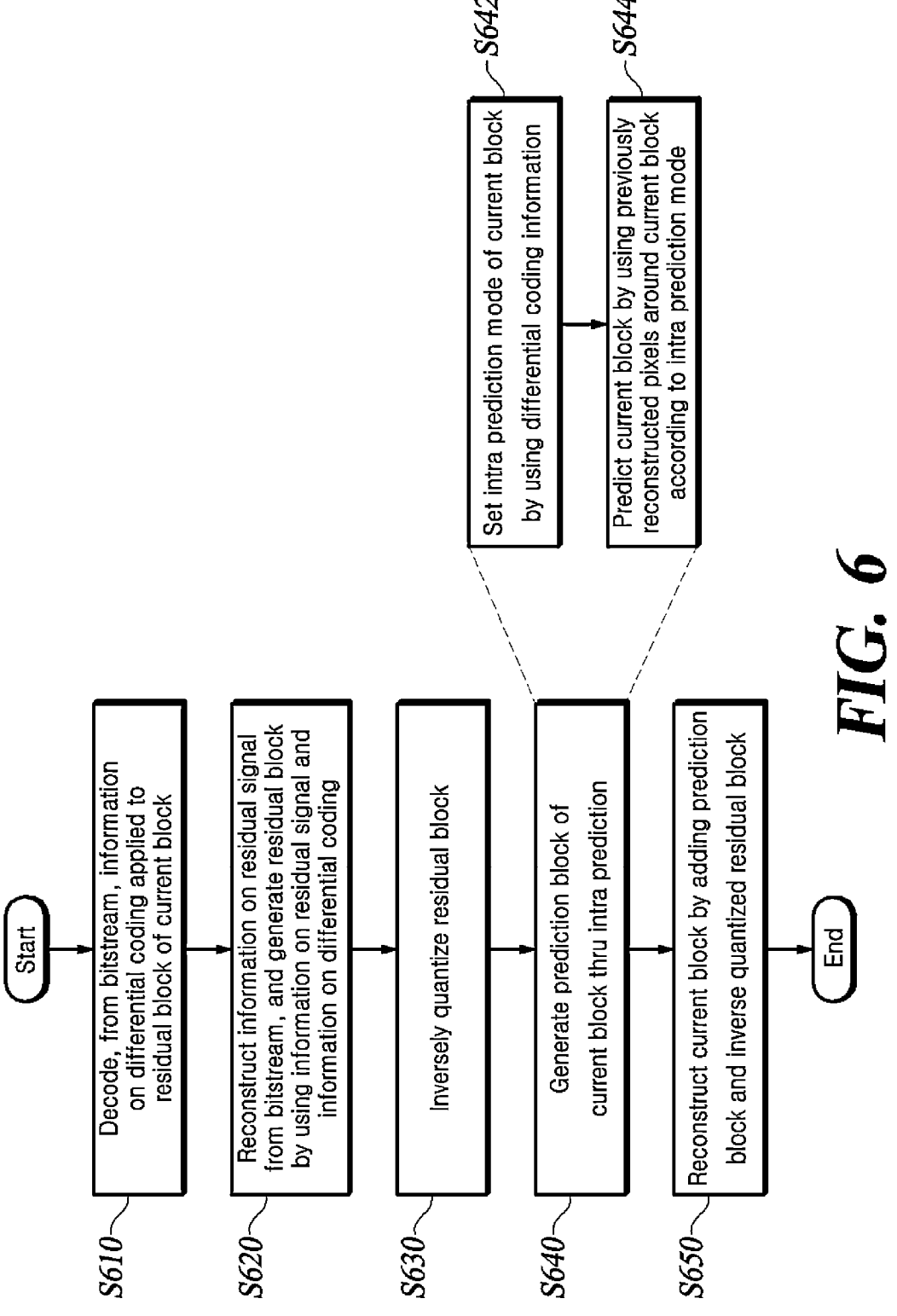

*FIG. 6*

S610 — Decode, from bitstream, information on differential coding applied to residual block of current block S620 — Reconstruct information on residual signal from bitstream, and generate residual block by using information on residual signal and information on differential coding S630 — Inversely quantize residual block S640 — Generate prediction block of current block thru intra prediction S650 — Reconstruct current block by adding prediction block and inverse quantized residual block S642 — Set intra prediction mode of current block by using differential coding information S644 — Predict current block by using previously reconstructed pixels around current block according to intra prediction mode Start End

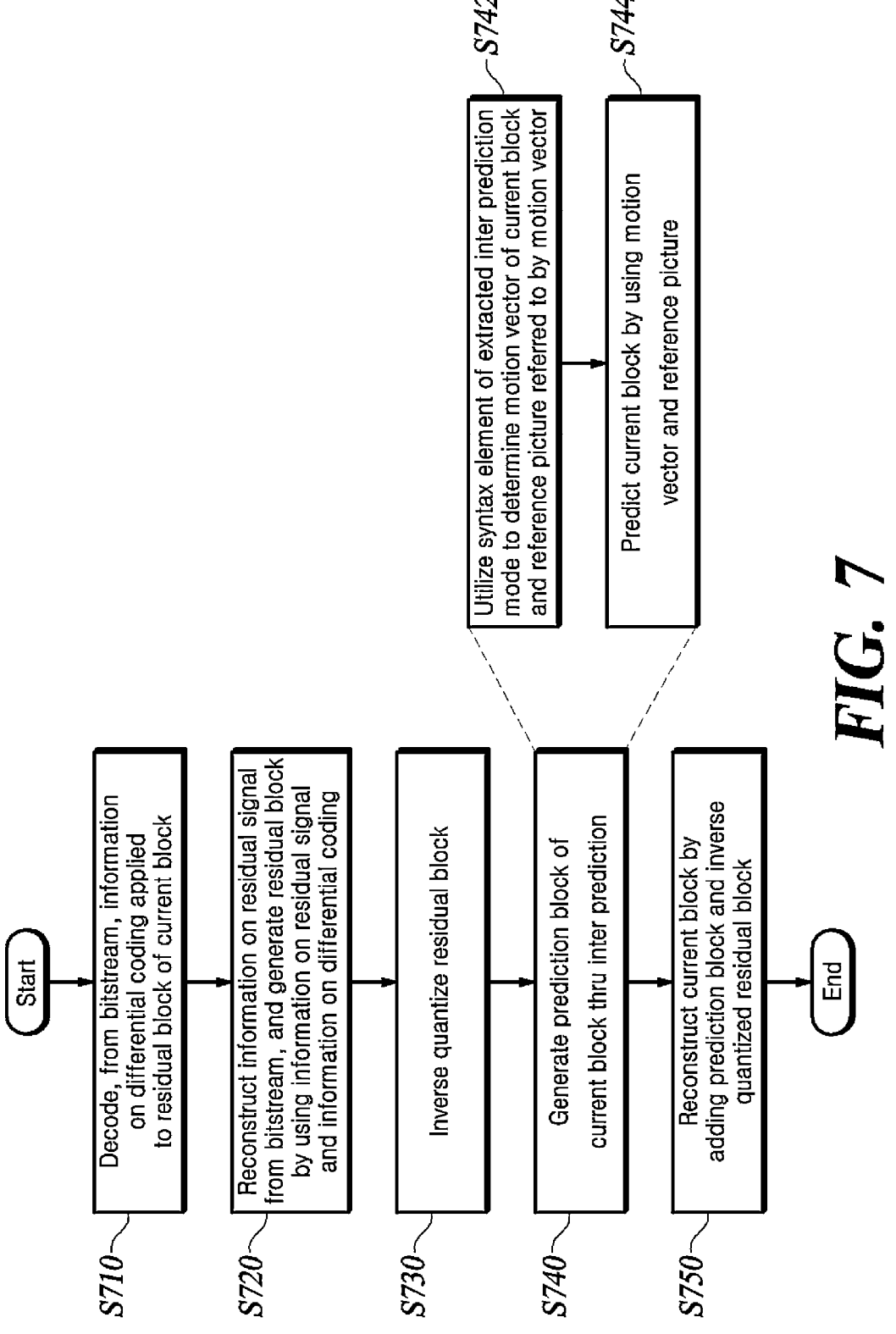

FIG. 7

S710 — Decode, from bitstream, information on differential coding applied to residual block of current block S720 — Reconstruct information on residual signal from bitstream, and generate residual block by using information on residual signal and information on differential coding S730 — Inverse quantize residual block S740 — Generate prediction block of current block thru inter prediction S750 — Reconstruct current block by adding prediction block and inverse quantized residual block S742 — Utilize syntax element of extracted inter prediction mode to determine motion vector of current block and reference picture referred to by motion vector S744 — Predict current block by using motion vector and reference picture

IMAGE DECODING DEVICE USING DIFFERENTIAL CODING

CROSS-REFERENCE TO RELATED APPLICATION

This application is a Continuation of application Ser. No. 17/438,596, filed on Sep. 13, 2021, U.S. application Ser. No. 17/438,596 is a National Phase application filed under 35 USC 371 of PCT International Application No. PCT/ KR2020/095036 filed on Mar. 13, 2020, which claims under 35 U.S.C. § 119 (a) the benefit of Korean Patent Application No. 10-2019-0028995 filed on Mar. 13, 2019, the entire contents of which are incorporated by reference herein.

BACKGROUND

(a) Technical Field

The present disclosure relates to the encoding and decoding of images or a video, more particularly, to video encoding and decoding using a differential coding technique performed in a transform skip mode.

(b) Description of the Related Art

The statements in this section merely provide background information related to the present disclosure and do not necessarily constitute prior art.

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoding unit can receive, decompress, and reproduce the compressed video data. Existing video compression technologies include H.264/AVC and High Efficiency Video Coding (HEVC), which improves the encoding efficiency of H.264/AVC by about 40%.

However, the constant increase of video images in size, resolution, and frame rate and the resultant increase of data amount to be encoded require a new and superior compression technique with better coding efficiency and higher image quality improvement over existing compression techniques.

SUMMARY

The present disclosure in some embodiments provides an apparatus for and a method of decoding a video by using a differential coding technique for a residual signal during decoding in a transform skip mode.

At least one aspect of the present disclosure provides a video decoding method for reconstructing a current block that is encoded using an intra prediction. The method includes decoding, from a bitstream, direction information indicating a direction of differential coding applied to a residual block of the current block, generating the residual block by reconstructing information on residual signals from the bitstream, and generating a modified residual block by modifying the residual signals in the residual block based on the direction information. Each target residual signal for modification in the residual block is modified by being summed with one or more residual signals in the residual block that are arranged in a direction indicated by the direction information from the target residual signal. The method further includes inversely quantizing the modified residual block into an inverse quantized residual block, generating a prediction block for the current block using the intra prediction, and reconstructing the current block by adding the prediction block and the inverse quantized residual block.

Another aspect of the present disclosure provides a video decoding apparatus for reconstructing a current block that is encoded using an intra prediction. The video decoding apparatus includes an entropy decoding unit, an inverse quantization unit, an intra prediction unit, and an adder. The entropy decoding unit is configured to decode, from a bitstream, direction information indicating a direction of differential coding applied to a residual block of the current block, and to generate the residual block by reconstructing information on residual signals from the bitstream. The inverse quantization unit is configured to generate a modified residual block by modifying the residual signals in the residual block based on the direction information, and to inverse quantize the modified residual block into an inverse quantized residual block. The intra prediction unit is configured to generate a prediction block for the current block through intra prediction. The adder is configured to add the prediction block and the inverse quantized residual block into a reconstructed current block. Here, each target residual signal for modification in the residual block is modified by being summed with one or more residual signals in the residual block that are arranged in a direction indicated by the direction information from the target residual signal.

As described above, some embodiments of the present disclosure provide a video decoding apparatus and method that utilize a differential coding technique for a residual signal during decoding in a transform skip mode, resulting in improved compression performance.

BRIEF DESCRIPTION OF THE DRAWINGS

FIG. 6 is a flowchart of a video decoding method for an intra prediction-coded block, using an explicit differential coding technique according to at least one embodiment of the present disclosure.

FIG. 7 is a flowchart of a video decoding method for an inter prediction-coded block, using an explicit differential coding technique according to at least one embodiment of the present disclosure.

DETAILED DESCRIPTION

Figure 1:
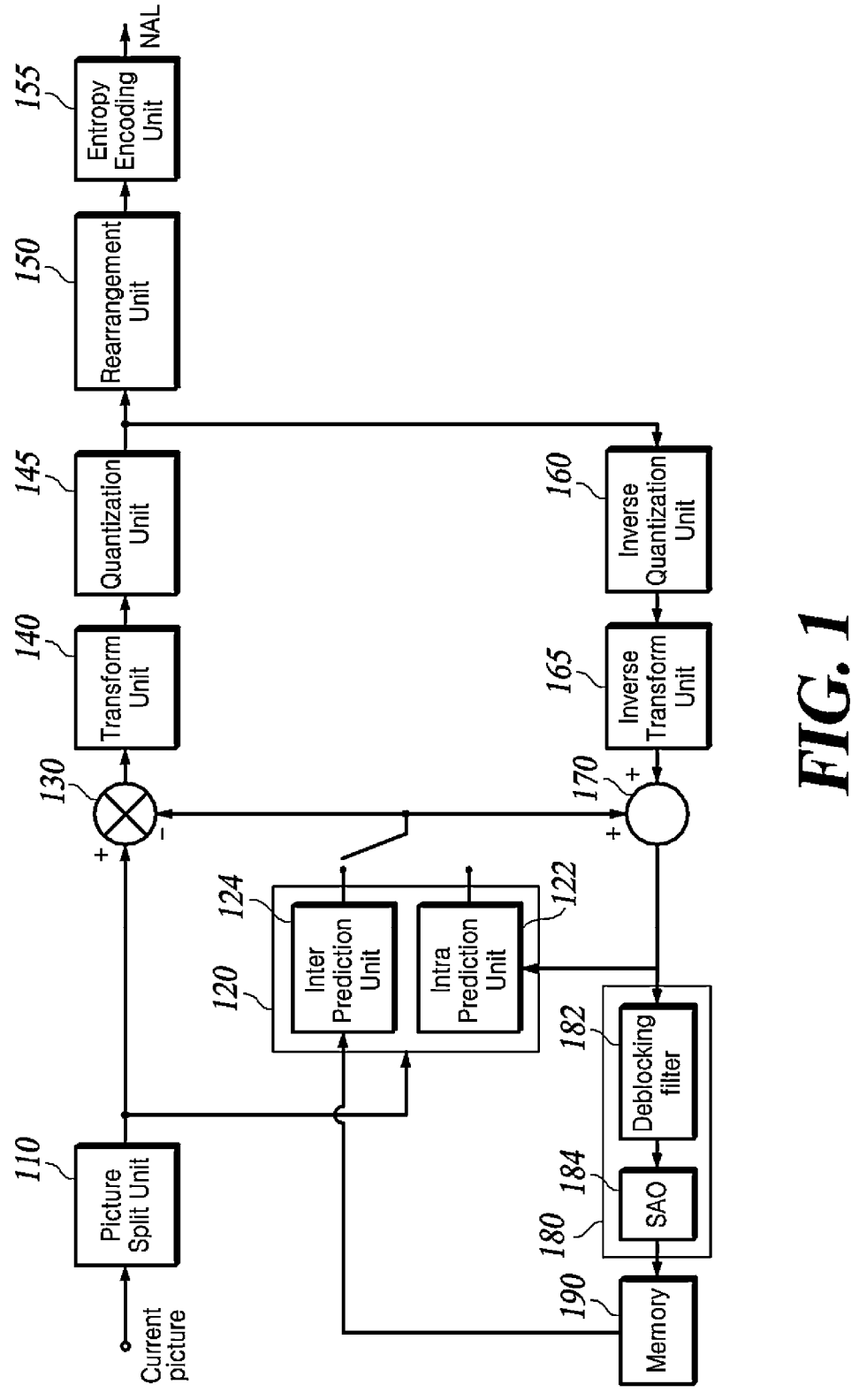
FIG. 1 is a block diagram illustrating a video encoding apparatus that can implement the techniques of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

The embodiments of the present disclosure concern encoding and decoding of a video. More specifically, the present disclosure provides an apparatus and method for decoding a video by using a differential coding technique for a residual signal to improve compression performance during coding in a transform skip mode.

FIG. 1 is a block diagram illustrating a video encoding apparatus that can implement the techniques of the present disclosure. Hereinafter, a video encoding apparatus and sub-components of the apparatus will be described with reference to FIG. 1.

The video encoding apparatus may be configured including a block split unit 110, a prediction unit 120, a subtractor 130, a transform unit 140, a quantization unit 145, a rearrangement unit 150, an entropy encoding unit 155, an inverse quantization unit 160, an inverse transform unit 165, an adder 170, a filter unit 180, and a memory 190.

The respective components of the video encoding apparatus may be implemented as hardware or software, or hardware and software combined. Additionally, the function of each component may be implemented by software and the function by software for each component may be implemented to be executed by a microprocessor.

A video is composed of a plurality of pictures. The pictures are each split into a plurality of regions, and encoding is performed for each region. For example, one picture is split into one or more tiles or/and slices. Here, one or more tiles may be defined as a tile group. Each tile or/and slice is split into one or more Coding Tree Units (CTUs). And each CTU is split into one or more Coding Units (CUs) by a tree structure. Information applied to the respective CUs are encoded as syntaxes of the CUS, and information commonly applied to CUs included in one CTU is encoded as a syntax of the CTU. Additionally, information commonly applied to all blocks in one slice is encoded as a syntax of a slice header, and information applied to all blocks constituting one picture is encoded in a Picture Parameter Set (PPS) or a picture header. Furthermore, information commonly referenced by a plurality of pictures is encoded in a Sequence Parameter Set (SPS). Additionally, information commonly referenced by one or more SPSs is encoded in a Video Parameter Set (VPS). In the same manner, information commonly applied to one tile or tile group may be encoded as a syntax of a tile header or tile group header.

The block split unit 110 determines the size of the coding tree unit (CTU). Information on the size of the CTU (CTU size) is encoded as a syntax of the SPS or PPS and transmitted to a video decoding apparatus.

The picture split unit 110 splits each picture constituting the video into a plurality of coding tree units (CTUs) having a predetermined size and then uses a tree structure to split the CTUs recursively. A leaf node in the tree structure becomes a coding unit (CU), which is a basic unit of encoding.

The tree structure may be a QuadTree (QT) in which an upper node (or parent node) is split into four equally sized lower nodes (or child nodes), a BinaryTree (BT) in which an upper node is split into two lower nodes, a TernaryTree (TT) in which an upper node is split into three lower nodes in a size ratio of 1:2:1, or a combination of two or more of the QT structure, BT structure, and TT structure. For example, a QuadTree plus Binary Tree (QTBT) structure may be used, or a QuadTree plus BinaryTree Ternary Tree (QTBTTT) structure may be used. Here, BTTT may be collectively referred to as a Multiple-Type Tree (MTT).

Figure 2:
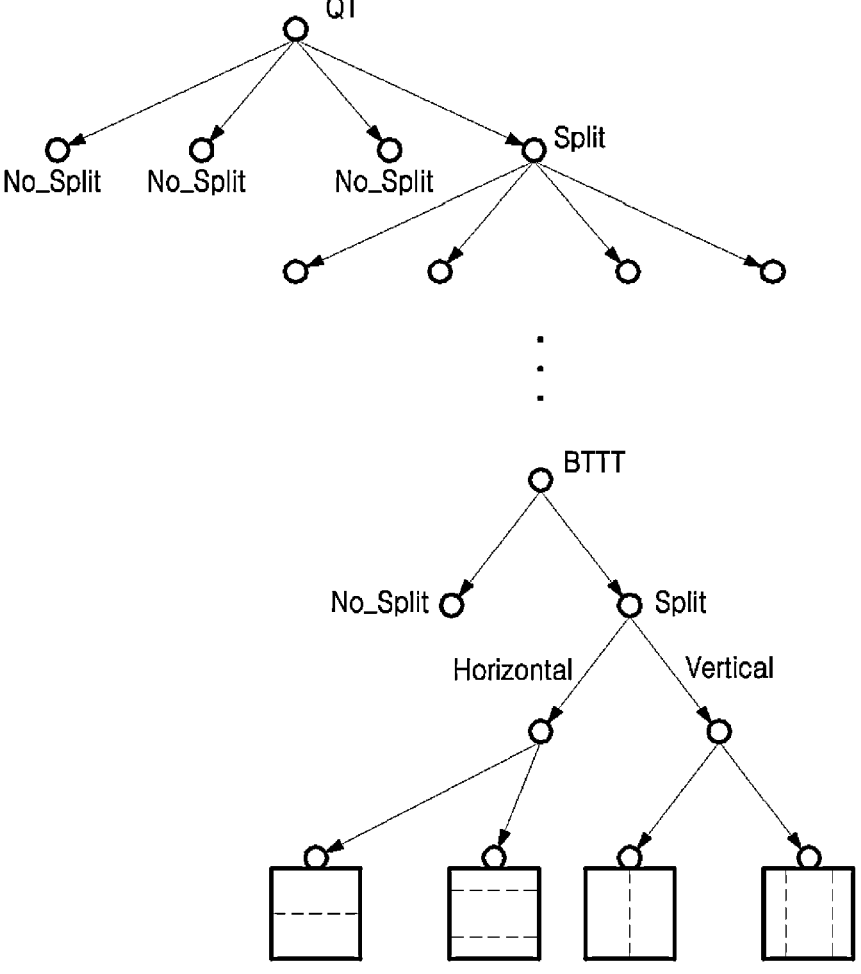
FIG. 2 is a diagram for explaining a method of splitting a block by using a QTBTTT structure.

FIG. 2 shows a QTBTTT split tree structure. As shown in FIG. 2, the CTU may be first split into a QT structure. The quadtree splitting may be repeated until the size of a splitting block reaches the minimum block size (MinQTSize) of a leaf node allowed in QT. A first flag (QT_split_flag) indicating whether each node of the QT structure is split into four nodes of a lower layer is encoded by the entropy encoding unit 155 and signaled to the video decoding apparatus. When the leaf node of the QT is not larger than the maximum block size (MaxBTSize) of the root node allowed in the BT, it may be further split into any one or more of the BT structure or the TT structure. In the BT structure and/or the TT structure, there may be a plurality of split directions. For example, there may be two directions in which the block of the relevant node is split horizontally and vertically. As shown in FIG. 2, when MTT splitting starts, a second flag (mtt_split_flag) indicating whether the nodes are split, and if yes, a further flag indicating split directions (vertical or horizontal) and/or a flag indicating partition or split type (binary or ternary) is encoded by the entropy encoding unit 155 and signaled to the video decoding apparatus.

Alternatively, before encoding the first flag (QT_split_flag) indicating whether each node is split into four nodes of a lower layer, a CU split flag (split_cu_flag) may be encoded indicating whether the node is split or not. When the CU split flag (split_cu_flag) value indicates that splitting is not performed, the block of the corresponding node becomes a leaf node in the split tree structure and serves a coding unit (CU), which is a basic unit of coding. When the CU split flag (split_cu_flag) value indicates that the node was split, the video encoding apparatus starts encoding from the first flag in an above-described manner.

As another example of the tree structure, when QTBT is used, there may be two types of partition including a type that horizontally splits the block of the relevant node into two equally sized blocks (i.e., symmetric horizontal partition) and a type that splits the same vertically (i.e., symmetric vertical partition). Encoded by the entropy encoding unit 155 and transmitted to the video decoding apparatus are a split flag (split_flag) indicating whether each node of the BT structure is split into blocks of a lower layer and partition type information indicating its partition type. Meanwhile, there may be a further type in which the block of the relevant node is split into two asymmetrically formed blocks. The asymmetric form may include a form of the block of the relevant node being split into two rectangular blocks having a size ratio of 1:3 or a form of the block of the relevant node being split in a diagonal direction.

A CU may have various sizes depending on the QTBT or QTBTTT split of the CTU. Hereinafter, a block corresponding to a CU to be encoded or decoded (i.e., a leaf node of QTBTTT) is referred to as a 'current block'. With QTBTTT splitting employed, the shape of the current block may be not only a square but also a rectangle.

The prediction unit 120 predicts the current block to generate a prediction block. The prediction unit 120 includes an intra prediction unit 122 and an inter prediction unit 124.

In general, the current blocks in a picture may each be predictively encoded. Prediction of the current block may be generally performed using an intra prediction technique or inter prediction technique, wherein the intra prediction technique uses data from a picture containing the current block and the inter prediction technique uses data from a picture which has been coded before the picture containing the current block. Inter prediction includes both unidirectional prediction and bidirectional prediction.

Figure 3A:
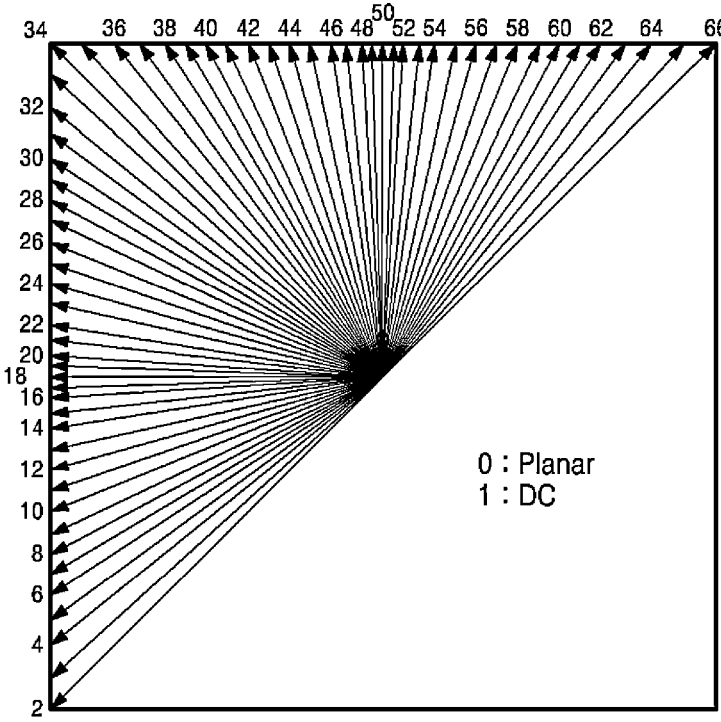
FIGS. 3A and 3B are diagrams of multiple intra prediction modes including wide-angle intra prediction modes.

The intra prediction unit 122 predicts pixels in the current block by using the neighboring pixels (reference pixels) located around the current block in the current picture. There is a plurality of intra-prediction modes according to the prediction directions. For example, as shown in FIG. 3A, the multiple intra prediction modes may include 2 non-directional modes including a planar mode and a DC mode and 65 directional modes. The respective prediction modes provide different corresponding definitions of the neighboring pixels and the calculation formula to be used.

Figure 3B:
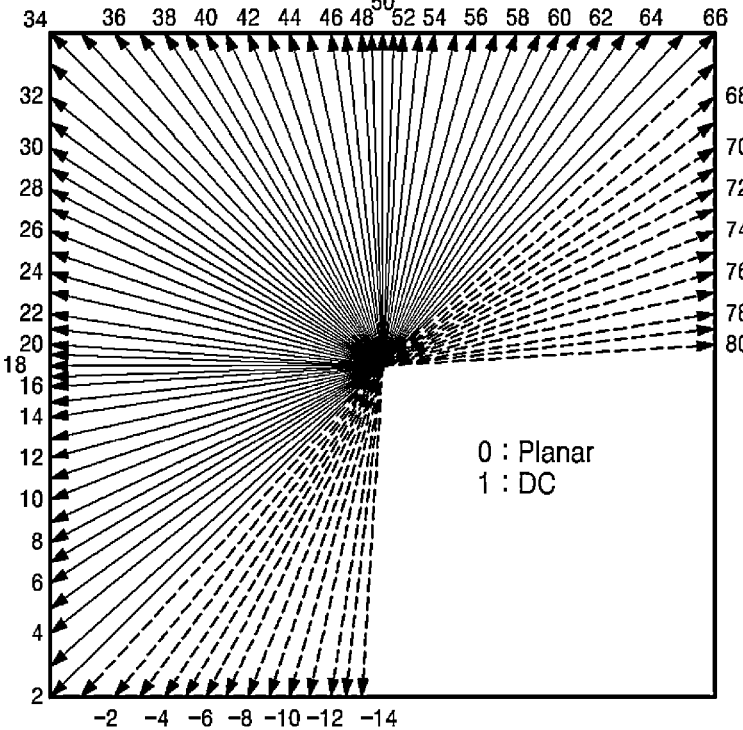

For efficient directional prediction of a rectangular-shaped current block, additional directional modes may be used as illustrated in FIG. 3B by dotted arrows of intra prediction modes (Nos. 67 to 80 and No. −1 to No. −14). These may be referred to as "wide-angle intra-prediction modes". Arrows in FIG. 3B indicate corresponding reference samples to be used for prediction, not prediction directions. The prediction direction is opposite to the direction indicated by the arrow. A wide-angle intra prediction mode is a mode in which prediction is performed in a direction opposite to a specific directional mode without additional bit transmission, when the current block has a rectangular shape. In this case, among the wide-angle intra prediction modes, some wide-angle intra prediction modes available for use in the current block may be determined by the ratio of the width to the height of the rectangular current block. For example, the wide-angle intra prediction modes that have an angle smaller than 45degrees (intra prediction modes at Nos. 67 to 80) may be used when the current block has a rectangular shape with the height less than the width. The wide-angle intra prediction modes having an angle of −135 degrees or greater (intra prediction modes at Nos. −1 to −14) may be used when the current block has a rectangular shape with the height greater than the width.

The intra prediction unit 122 may determine an intra prediction mode to be used for encoding the current block. In some examples, the intra prediction unit 122 may encode the current block by using several intra prediction modes and select an appropriate intra prediction mode to use from tested modes. For example, the intra prediction unit 122 may calculate rate-distortion values through rate-distortion analysis of several tested intra prediction modes and select an intra prediction mode that has the best rate-distortion characteristics among the tested modes.

The intra prediction unit 122 selects one intra prediction mode from among a plurality of intra prediction modes and predicts the current block by using at least one neighboring pixel (reference pixel) determined according to the selected intra prediction mode and calculation formula. Information on the selected intra prediction mode is encoded by the entropy encoding unit 155 and transmitted to the video decoding apparatus.

The inter prediction unit 124 generates a prediction block for the current block through a motion compensation process. The inter prediction unit 124 searches for a block most similar to the current block in a reference picture which has been encoded and decoded earlier than the current picture, and generates a prediction block of the current block by using the searched block. Then, the inter prediction unit 124 generates a motion vector corresponding to the displacement between the current block in the current picture and the prediction block in a reference picture. In general, motion estimation is performed on a luma component, and a motion vector calculated based on the luma component is used for both the luma component and the chroma component. Motion information including information on the reference picture and information on the motion vector used to predict the current block is encoded by the entropy encoding unit 155 and transmitted to the video decoding apparatus.

The subtractor 130 generates a residual block by subtracting, from the current block, the prediction block generated by the intra prediction unit 122 or the inter prediction unit 124.

The transform unit 140 transforms the residual signal in the residual block having pixel values in the spatial domain into transform coefficients in the frequency domain. The transform unit 140 may transform the residual signals in the residual block by using the full size of the residual block as a transform unit, or divide the residual block into a plurality of subblocks and use the subblocks as transform units to perform the transform. Alternatively, the transform unit 140 may separate the residual block into two subblocks, which are a transform region and a non-transform region, and use only the transform-region subblock as a transform unit to transform the residual signals. Here, the transform-region subblock may be one of two rectangular blocks having a size ratio of 1:1 based on the horizontal axis (or vertical axis). In this case, the flag (cu_sbt_flag) indicating that only a single subblock is transformed, directional (vertical/horizontal) information (cu_sbt_horizontal_flag), and/or position information (cu_sbt_pos_flag) are encoded by the entropy encoding unit 155 and signaled to the video decoding apparatus. Additionally, the size of the transform-region subblock may have a size ratio of 1:3 based on the horizontal axis (or vertical axis). In this case, a flag (cu_sbt_quad_flag) distinguishing the corresponding splitting is additionally encoded by the entropy encoder 155 and signaled to the video decoding apparatus.

Meanwhile, the transform unit 140 may separately transform the residual block in horizontal directions and vertical directions. For transform operation, various types of transform functions or transform matrices may be used. For example, pairs of transform functions for horizontal transform and vertical transform may be defined as a multiple transform set (MTS). The transform unit 140 may select one pair of transform functions having the best transform efficiency in the MTS and transform the residual block in horizontal and vertical directions, respectively. Information (mts_idx) on the pair of transform functions selected in the MTS is encoded by the entropy encoder 155 and signaled to the video decoding apparatus. The size of a transform block to which MTS is applied may be limited to 32×32 and under.

The quantization unit 145 quantizes the transform coefficients outputted from the transform unit 140 and outputs the quantized transform coefficients to the entropy encoding unit 155.

The rearrangement unit 150 may perform rearrangement of coefficient values with the quantized transform coefficients.

The rearrangement unit 150 may use coefficient scanning for changing the two-dimensional coefficient array into a one-dimensional coefficient sequence. For example, the rearrangement unit 150 may scan coefficients from a DC coefficient toward coefficients in a high-frequency region through a zig-zag scan or a diagonal scan to output a one-dimensional coefficient sequence. Depending on the size of the transform unit and the intra prediction mode, the zig-zag scan used may be replaced by a vertical scan for scanning the two-dimensional coefficient array in a column direction and a horizontal scan for scanning the two-dimensional block shape coefficients in a row direction. In other words, a scanning method to be used may be determined among a zig-zag scan, a diagonal scan, a vertical scan, and a horizontal scan according to the size of the transform unit and the intra prediction mode.

The entropy encoding unit 155 encodes a sequence of the one-dimensional quantized transform coefficients outputted from the rearrangement unit 150 by using various encoding methods such as Context-based Adaptive Binary Arithmetic Code (CABAC), Exponential Golomb, and the like, encoding to generate a bitstream.

Additionally, the entropy encoding unit 155 encodes information on block partition, such as CTU size, CU split flag, QT split flag, MTT split type, and MTT split direction for allowing the video decoding apparatus to split the block in the same way as the video encoding apparatus. Additionally, the entropy encoding unit 155 encodes information on a prediction type indicating whether the current block is encoded by intra prediction or inter prediction, and encodes, depending on the prediction type, intra prediction information (i.e., information on intra prediction mode) or inter prediction information (i.e., information on reference pictures and motion vectors).

The inverse quantization unit 160 inversely quantizes the quantized transform coefficients outputted from the quantization unit 145 to generate transform coefficients. The inverse transform unit 165 transforms the transform coefficients outputted from the inverse quantization unit 160 from the frequency domain to the spatial domain to reconstruct the residual block.

The adder 170 adds the reconstructed residual block and the prediction block generated by the prediction unit 120 to reconstruct the current block. Pixels in the reconstructed current block are used as reference pixels when intra-predicting a next block.

The filter unit 180 performs filtering on the reconstructed pixels to reduce blocking artifacts, ringing artifacts, blurring artifacts, etc. generated due to block-based prediction and transform/quantization. The filter unit 180 may include a deblocking filter 182 and a sample adaptive offset (SAO) filter 184.

The deblocking filter 180 filters the boundary between the reconstructed blocks to remove a blocking artifact caused by block-by-block encoding/decoding, and the SAO filter 184 performs additional filtering on the deblocking filtered video. The SAO filter 184 is a filter used to compensate for a difference between a reconstructed pixel and an original pixel caused by lossy coding.

The reconstructed block is filtered through the deblocking filter 182 and the SAO filter 184 and stored in the memory 190. When all blocks in one picture are reconstructed, the reconstructed picture may be used as a reference picture for inter-prediction of blocks in a picture to be subsequently encoded.

Figure 4:
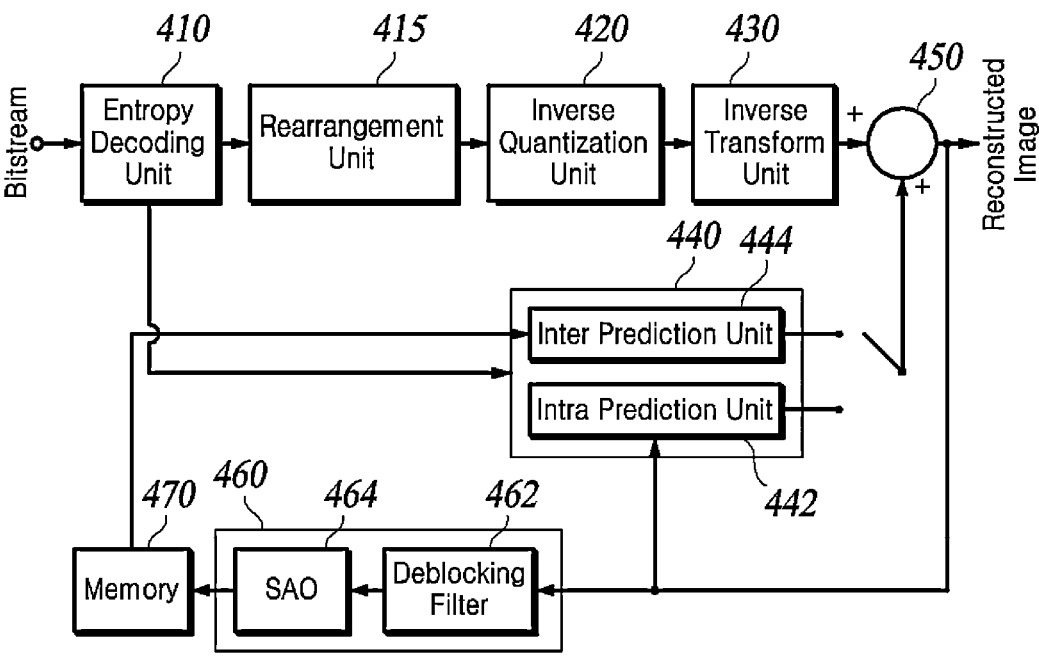
FIG. 4 is a block diagram illustrating a video decoding apparatus capable of implementing the techniques of the present disclosure.

FIG. 4 is a functional block diagram illustrating a video decoding apparatus capable of implementing the techniques of the present disclosure. Hereinafter, the video decoding apparatus and sub-components of the apparatus will be described referring to FIG. 4.

The video decoding apparatus may be configured including an entropy decoding unit 410, a rearrangement unit 415, an inverse quantization unit 420, an inverse transform unit 430, a prediction unit 440, an adder 450, a filter unit 460, and a memory 470.

As with the video encoding apparatus of FIG. 1, the respective components of the video decoding apparatus may be implemented as hardware or software, or hardware and software combined. Additionally, the function of each component may be implemented by software and the function by software for each component may be implemented to be executed by a microprocessor.

The entropy decoding unit 410 decodes the bitstream generated by the video encoding apparatus and extracts information on block partition to determine the current block to be decoded, and extracts prediction information and information on residual signal, and the like required to reconstruct the current block.

The entropy decoding unit 410 extracts information on the CTU size from a sequence parameter set (SPS) or a picture parameter set (PPS), determines the size of the CTU, and splits the picture into CTUs of the determined size. Then, the entropy decoding unit 410 determines the CTU as the highest layer, i.e., the root node of the tree structure, and extracts the split information on the CTU, and thereby splits the CTU by using the tree structure.

For example, when splitting the CTU by using the QTBTTT structure, a first flag (QT_split_flag) related to QT splitting is first extracted and each node is split into four nodes of a lower layer. For the node corresponding to the leaf node of QT, the entropy decoding unit 410 extracts the second flag (MTT_split_flag) related to the partition of MTT and information of the split direction (vertical/horizontal) and/or split type (binary/ternary) so as to split the corresponding leaf node by an MTT structure. This allows the respective nodes below the leaf node of QT to be recursively split into a BT or TT structure.

As another example, when splitting the CTU by using the QTBTTT structure, the entropy decoding unit 410 may first extract a CU split flag (split_cu_flag) indicating whether a CU is split. When the relevant block is split, it may extract a first flag (QT_split_flag). In the splitting process, each node may have zero or more recursive QT splits followed by zero or more recursive MTT splits. For example, the CTU may immediately enter MTT split, or conversely, have multiple QT splits alone. As yet another example, when splitting the CTU by using the QTBT structure, the entropy decoding unit 410 extracts a first flag (QT_split_flag) related to QT splitting to split each node into four nodes of a lower layer. And, for a node corresponding to a leaf node of QT, the entropy decoding unit 410 extracts a split flag (split_flag) indicating whether that node is or is not further split into BT and split direction information.

Meanwhile, when the entropy decoding unit 410 determines the current block to be decoded through the tree-structure splitting, it extracts information on a prediction type indicating whether the current block was intra-predicted or inter-predicted. When the prediction type information indicates intra prediction, the entropy decoding unit 410 extracts a syntax element for intra prediction information (intra prediction mode) of the current block. When the prediction type information indicates inter prediction, the entropy decoding unit 410 extracts a syntax element for the inter prediction information, that is, information indicating a motion vector and a reference picture referenced by the motion vector.

Meanwhile, the entropy decoding unit 410 extracts information on the quantized transform coefficients of the current block as information on the residual signal.

The rearrangement unit 415 changes, in a reverse order of the coefficient scanning performed by the video encoding apparatus, the sequence of the one-dimensional quantized transform coefficients entropy-decoded by the entropy decoding unit 410 into a two-dimensional coefficient array (i.e. block).

The inverse quantization unit 420 inversely quantizes the quantized transform coefficients. The inverse transform unit 430 inversely transforms the inverse quantized transform coefficients from the frequency domain to the spatial domain to reconstruct the residual signals, and thereby generates a reconstructed residual block of the current block.

Additionally, when the inverse transform unit 430 inversely transforms only a partial region (subblock) of the transform block, it extracts a flag (cu_sbt_flag) indicating that only the subblock of the transform block has been transformed, the subblock's directionality (vertical/horizontal) information (cu_sbt_horizontal_flag), and/or subblock's position information (cu_sbt_pos_flag), and inversely transforms the transform coefficients of the subblock from the frequency domain to the spatial domain to reconstruct the residual signals. At the same time, the inverse transform unit 430 fills the remaining region which is not inversely transformed with the "0" value as the residual signals, and thereby generates the final residual block for the current block.

Additionally, when MTS is applied, the inverse transform unit 430 utilizes the MTS information (mts_idx) signaled from the video encoding apparatus to determine transform functions or transform matrices to be applied in the horizontal and vertical directions, respectively, and utilizes the determined transform function to perform the inverse transform on the transform coefficients in the transform block in the horizontal and vertical directions.

The prediction unit 440 may include an intra prediction unit 442 and an inter prediction unit 444. The intra prediction unit 442 is activated when the prediction type of the current block is intra prediction, and the inter prediction unit 444 is activated when the prediction type of the current block is inter prediction.

The intra prediction unit 442 determines, among a plurality of intra prediction modes, the intra prediction mode of the current block from the syntax element for the intra prediction mode extracted by the entropy decoding unit 410, and according to the determined intra prediction mode, it predicts the current block by using neighboring reference pixels of the current block.

The inter prediction unit 444 utilizes the syntax element for the intra prediction mode extracted by the entropy decoding unit 410 to determine a motion vector of the current block and a reference picture referenced by the motion vector, and it utilizes the motion vector and the reference picture to predict the current block.

The adder 450 adds the residual block outputted from the inverse transform unit and the prediction block outputted from the inter prediction unit or the intra prediction unit to reconstruct the current block. Pixels in the reconstructed current block are used as reference pixels when intra-predicting a next block to be decoded.

The filter unit 460 may include a deblocking filter 462 and an SAO filter 464. The deblocking filter 462 performs deblock-filtering on the boundary between reconstructed blocks to remove a blocking artifact caused by block-by-block decoding. The SAO filter 464 performs additional filtering on the reconstructed block after the deblock-filtering to compensate for the difference between the reconstructed pixel and the original pixel caused by lossy coding. The reconstructed block is filtered through the deblocking filter 462 and the SAO filter 464 and stored in the memory 470. When all blocks in one picture are reconstructed, the reconstructed picture is used as a reference picture for inter-prediction of blocks within a picture to be subsequently encoded.

As described above, the video encoding apparatus transforms the residual signals into transform coefficients in the frequency domain, encodes and signals the transform coefficients to the video decoding apparatus. The video decoding apparatus inversely transforms the transform coefficients into spatial-domain residual signals. However, depending on the characteristics of the video or residual signals, most of the transform coefficients generated as a result of the transform are possibly located in the high-frequency region. In this case, encoding transform coefficients of the frequency domain may have reduced encoding efficiency than encoding the spatial-domain residual signals.

The transform skip (TS) mode is a technique for direct entropy encoding the residual signals without transforming them, and generally does not have excellent encoding performance compared to discrete cosine transform (DCT). However, since screen content contains a lot of residual components in the high-frequency band, which occur at the boundary of graphic elements with high color contrast, the transform skip mode is useful for videos with screen content coding (SCC) or similar characteristics.

When the transform skip mode is applied, a transform skip residual coding process is used to quantize and encode the predicted residual signals. The transform skip residual coding process is a method in which a transform coefficient coding process is modified to be suitable for SCC.

Information on the transform skip mode (transform_skip_flag[x0][y0][cIdx], hereinafter transform_skip_flag) may be delivered in units of transform blocks. Here, (x0,y0) is the top-left position of the transform block, cIdx is an indicator for color elements with 0 denoting luma, 1 denoting Cb of chroma, and 2 indicating Cr. When transform skip mode 'transform_skip_flag' is 1, transform is skipped, and when it is 0, whether to perform or skip the transform may be determined according to another syntax element.

Meanwhile, the size of a transform block to which the transform skip mode can be applied may be limited to fall within 32×32. In this case, encoding of transform_skip_flag may be omitted for a transform block larger than the size of the transform block to which the transform skip mode can be applied, and the video decoding apparatus does not apply the transform skip mode to the transform block when it is greater than 32×32. Alternatively, size information on the size of a transform block to which the transform skip mode can be applied may be encoded as a high-level syntax, for example, a syntax element in SPS or PPS, and signaled to the video decoding apparatus. For a transform block larger than the size defined by the high-level syntax, encoding of transform_skip_flag is omitted. The video decoding apparatus decodes the size information on the size of a transform block to which the transform skip mode can be applied, and it neither decodes transform_skip_flag nor applies the transform skip mode when the current transform block to be transformed is larger than a size indicated by the size information.

Information on MTS and transform skip mode may be integrated as shown in Table 1 and expressed as a single syntax.

TABLE 1

| | | | binarization | | |
|---|---|---|---|---|---|
| | transform type | | MTS & TS | MTS | TS |
| tu_mts_idx | horizontal | vertical | enabled | enabled | enabled |
| 0 | SKIP | SKIP | 0 | — | 0 |
| 1 | DCT-II | DCT-II | 10 | 0 | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

As shown in Table 1, MTS and transform skip mode may be set according to tu mts_idx. Here, for the range of 0 to 5, tu_mts_idx is expressed as truncated unary codes.

The following describes a differential coding technique capable of improving compression performance in a transform skip mode with a video encoding apparatus and a video decoding apparatus.

When a transform unit (TU) is encoded in a transform skip mode with lossy compression, a differential coding technique may be applied to a residual signal after intra prediction or inter prediction. In the transform skip mode, the differential coding technique can reduce the total amount of energy of a residual component for entropy encoding and thereby provide further improved compression performance.

Figure 5:
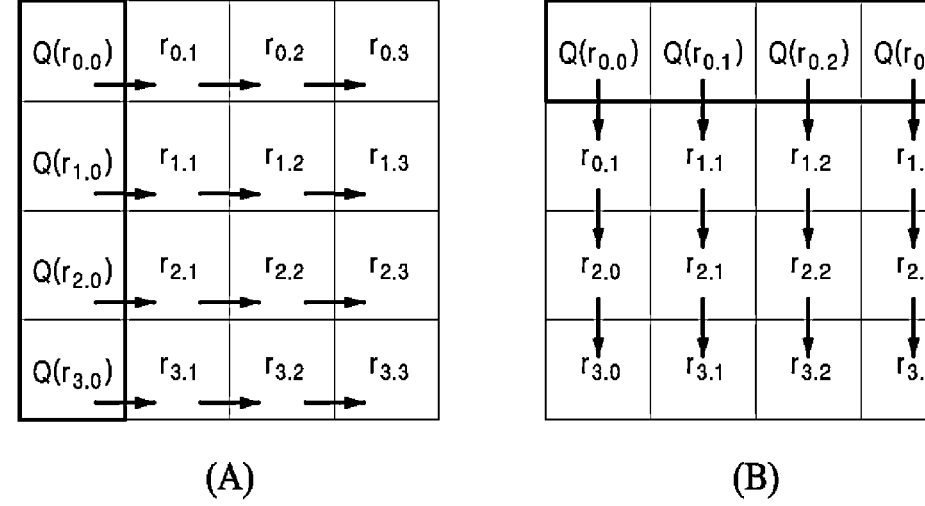
FIG. 5 illustrates differential coding techniques according to at least one embodiment of the present disclosure.

FIG. 5 illustrates differential coding techniques according to at least one embodiment of the present disclosure.

In the horizontal differential coding technique, as shown in FIG. 5 at a matrix labeled (A), the current sample is predicted by using, among the samples encoded by the video encoding apparatus, a residual component of the most adjacent left column in the horizontal direction. Once the horizontal differential coding technique is applied to residual signals $r_{i,j}$ of the block of size N×N (N is a natural number), the resultant residual signals $\widetilde{r_{i,j}}$ (0≤i<N, i is a natural number) may be expressed by Equation 1. In particular, the residual signal at position (i, j) is modified by subtraction of the residual signal at position (i, j-1) therefrom. Here, (i, j) denotes the i-th row and the j-th column.

$$\widetilde{r_{i,j}} = \begin{cases} r_{i,j}, & j = 0 \\ r_{i,j} - Q(r_{i,j-1}), & 0 < j < N \end{cases} \qquad \text{Equation 1}$$

Here, Q(r) is a reconstructed residual signal including quantization noise.

As shown in Equation 1, with the horizontal differential coding, the encoding apparatus entropy-encodes and then transmits the residual signals $\widetilde{r_{i,j}}$ to the decoding apparatus and reserves the same after reconstruction to predict the residual signals of the next column. The horizontal prediction process may be sequentially performed for all columns of the block.

In the vertical differential coding technique, as shown in FIG. 5 at a matrix labeled (B), the current sample is predicted by using, among the samples encoded by the video encoding apparatus, a residual component of the most adjacent upper column in the vertical direction. After the vertical differential coding technique is applied to the residual signals $r_{i,j}$ of the N×N block, the resultant residual signals $\widetilde{r_{i,j}}$ (0≤i<N, i is a natural number) may be expressed by Equation 2. In particular, the residual signal at position (i,j)

is modified by subtraction of the residual signal at position (i-1, j) therefrom. Here, (i,j) denotes the i-th row and the j-th column, too.

$$\widetilde{r_{i,j}} = \begin{cases} r_{i,j}, & i = 0 \\ r_{i,j} - Q(r_{i-1,j}), & 0 < i < N \end{cases} \qquad \text{Equation 2}$$

As shown in Equation 2, with the vertical differential coding, the encoding apparatus side entropy-encodes and then transmits the residual signals $\widetilde{r_{i,j}}$ to the decoding apparatus side and reserves the same after reconstruction to predict the residual signals of the next row. The vertical prediction process may be sequentially performed for all rows of the block.

When the horizontal differential coding technique is applied, the video decoding apparatus reconstructs the residual signals as shown in Equation 3. In other words, the residual signals in the residual block reconstructed by the video decoding apparatus from the bitstream are modified according to the horizontal differential coding technique. The target residual signal to be modified in the reconstructed residual block is modified in such a way that left residual signals located on the same row to the left of the target residual signal are added to the target residual signal.

$$Q(r_{i,j}) = \sum_{k=0}^{j} Q(\widetilde{r_{i,k}}), \, 0 \le j < N \qquad \text{Equation 3}$$

The video decoding apparatus may sequentially add the reconstructed residual signals and thereby reconstruct the residual signals of the j-th column. The horizontal reconstruction process may be sequentially performed for all columns of the block.

When the vertical differential coding technique is applied, the video decoding apparatus reconstructs the residual signals as shown in Equation 4. The residual signals in the residual block reconstructed by the video decoding apparatus from the bitstream are modified according to the vertical differential coding technique. The to-be-modified target residual signal in the reconstructed residual block is modified in such a way that upper residual signals located on the same column above the target residual signal are added to the target residual signal.

$$Q(r_{i,j}) = \sum_{k=0}^{i} Q(\widetilde{r_{k,j}}), \, 0 \le i < N \, | \qquad \text{Equation 4}$$

The video decoding apparatus may sequentially add the reconstructed residual signals and thereby reconstruct the residual signals of the i-th row. The vertical reconstruction process may be sequentially performed for all rows of the block.

The above description illustrates the differential coding in the horizontal and vertical directions, although the differential coding direction is not necessarily limited to only the horizontal and vertical directions. The differential coding direction may include the horizontal and vertical directions, and it may further include other directions, for example, a 45-degree diagonal direction and a 135-degree diagonal direction. In this manner, the video decoding apparatus may add, to the target residual signal for modification in the residual block reconstructed from the bitstream, one or more residual signals in the residual block, which are arranged in the differential coding direction from the target residual signal, and thereby modifies the target residual signal.

In the case of implicit differential coding, the video decoding apparatus may infer prediction direction information of the differential coding from intra prediction information decoded in advance. For example, when the current block uses intra prediction and the intra prediction mode is directional mode No. 18, the horizontal differential coding may be applied to the residual signals. When the current block uses intra prediction and the intra prediction mode is directional mode No. 50, the vertical differential coding may be applied to the residual signals.

In another embodiment of the present disclosure, when the current block uses intra prediction and the difference between the intra prediction mode and directional mode No. 18 is smaller than a preset threshold range as shown in Equation 5, the horizontal differential coding may be applied to the residual signals.

$$| predModeIntra - INTRA\_ANGULAR18 | < threshold \qquad \text{Equation 5}$$

Here, predModeIntra is an intra prediction mode of the current block, and |.| indicates an absolute value.

Additionally, when the current block uses intra prediction and the difference between the intra prediction mode and directional mode No. 50 is smaller than a preset threshold range as shown in Equation 6, the vertical differential coding may be applied to the residual signals.

$$| predModeIntra - INTRA\_ANGULAR50 | < threshold | \qquad \text{Equation 6}$$

Meanwhile, in the case of explicit differential coding, the video decoding apparatus may determine information on the differential coding prediction mode by decoding the information from a bitstream.

When the transform skip mode, i.e., transform_skip_flag, is true, the video decoding apparatus receives the differential coding information diff_cod_idx as shown in Table 2 and determines whether to apply the differential coding technique to the current block.

TABLE 2

| diff_cod_idx | differential coding type | binarization |
|---|---|---|
| 0 | DIFF_COD_OFF | 0 (or 1) |
| 1 | DIFF_COD_VER | 10 (or 00) |
| 2 | DIFF_COD_HOR | 11 (or 01) |

In Table 2, DIFF_COD_OFF is a mode in which no additional differential coding is performed after skipping transform, and DIFF_COD_VER and DIFF_COD_HOR are prediction modes of predicting in a vertical or horizontal direction. The indices of the prediction modes in the vertical direction or the horizontal direction may be interchangeable. As shown in Table 2, when diff_cod_idx is not 0, the syntax is binarized into 2 bits. The first bit may be expressed as 1, and the second bit may be expressed as 0 or 1 depending on the direction. The video decoding apparatus recognizes from the first bit that the differential coding is applied, and identifies the direction of the differential coding from the second bit. On the other hand, when diff_cod_idx is 0 (DIFF_COD_OFF), the syntax is binarized to 0. This case does not require the second bit for indicating the differential coding direction. In the above example, the application or non-application of differential coding and the direction of the differential coding are expressed as one syntax. However, from the results of binarization shown in Table 2, it is obvious that the application or non-application of differential coding and the direction of the differential coding can be encoded as separate syntaxes. For example, two syntaxes may be used with a 1-bit flag indicating application or no-application of differential coding and a 1-bit flag indicating the differential coding direction.

In another embodiment of the present disclosure, the transform skip mode information of transform_skip_flag and the differential coding information of diff_cod_idx may be integrated and expressed as shown in Table 3.

TABLE 3

| transform_skip_idx | differential coding type | binarization |
|---|---|---|
| 0 | DIFF_COD_OFF | 0 (or 1) |
| 1 | DIFF_COD_VER | 10 (or 00) |
| 2 | DIFF_COD_HOR | 111 (or 01) |
| −1 | Transform skip disabled | — |

Here, 'transform_skip_idx=0' performs the same operation as with 'transform_skip_flag=1'. Additionally, 'transform_skip_idx=−1' operates as with 'transform_skip_flag=0'.

In another embodiment of the present disclosure, transform skip mode information of transform_skip_flag, differential coding information of diff_cod_idx, and MTS information of tu_mts_idx may be integrated and expressed as shown in Table 4.

TABLE 4

| tu_mts_diff_ cod_idx | transform type | | differential coding type | binarization |
| | horizontal | vertical | | |
|---|---|---|---|---|
| 0 | SKIP | SKIP | DIFF_COD_OFF | 00 |
| 1 | | | DIFF_COD_VER | 010 |
| 2 | | | DIFF_COD_HOR | 011 |
| 3 | DCT-II | DCT-II | — | 10 |
| 4 | DST-VII | DST-VII | — | 110 |
| 5 | DCT-VIII | DST-VII | — | 1110 |
| 6 | DST-VII | DCT-VIII | — | 11110 |
| 7 | DCT-VIII | DCT-VIII | — | 111110 |

Explicit differential coding according to the present disclosure can be applied to both intra prediction and inter prediction modes.

When explicit differential coding is applied to the intra prediction mode, information on the intra prediction mode may be omitted and only the differential coding-related syntax may be encoded. The intra prediction mode of the current block is set equal to the direction of differential coding. As described above, when using 67 intra prediction modes, a large number of bits are required to signal information on the intra prediction mode applied to the current block. The application of explicit differential coding in intra prediction can reduce the number of bits required to encode information on the intra prediction mode by inferring the direction of the intra prediction mode from the direction of the differential coding. In other words, by inferring the intra prediction mode from the syntax on the differential coding prediction direction, the amount of transmitted codes is reduced.

Alternatively, when applying differential coding, the intra prediction mode of the current block may be constrained to allow the use of intra prediction modes exclusively within a threshold range from the direction of the differential coding. For example, when applying the horizontal differential coding, only intra prediction modes satisfying Equation 5 are allowable as intra prediction modes of the current block among all intra prediction modes. When applying the vertical differential coding, only intra prediction modes satisfying Equation 6 are allowable as intra prediction modes of the current block among all intra prediction modes. Accordingly, since the selection of the intra-prediction modes of the current block is made from among some intra-prediction modes similar to the differential coding direction rather than the entire intra-prediction modes, the number of bits required to encode the intra prediction mode of the current block can be reduced. The video decoding apparatus may generate a set of candidates composed of intra prediction modes within a threshold range from the differential coding direction and may set, as the intra prediction mode of the current block, a candidate which is indicated by the intra prediction mode information received from the video encoding apparatus among the set of candidates.

The video encoding apparatus and the video decoding apparatus may not perform deblock-filtering on the boundary between the current block and the adjacent block when the differential coding technique is applied to both the residual block of the current block and the residual block of the adjacent block.

FIG. 6 is a flowchart of a video decoding method for decoding a block encoded through the intra prediction, using an explicit differential coding technique according to at least one embodiment of the present disclosure.

The video decoding apparatus decodes, from a bitstream, information on differential coding applied to the residual block of the current block (S610).

The information on differential coding may include a flag indicating whether the differential coding is applied, and a flag for indicating the differential coding direction.

The video decoding apparatus may decode the information on differential coding applied to the residual block of the current block. The differential coding information may be transmitted to the video decoding apparatus as a syntax element of diff_cod_idx as shown in Table 2.

The video decoding apparatus reconstructs information on the residual signal from the bitstream and generates the residual block by using the information on the residual signal and the differential coding information (S620).

The video decoding apparatus first reconstructs information on the residual signal.

For example, the video decoding apparatus reconstructs a flag (tu_cbf_luma) indicating whether there exists a residual signal with respect to the current block. When a residual signal is present (tu_cbf_luma is true), residual signals for the current block are reconstructed from the bitstream. On the other hand, when tu_cbf_luma is false, all residual signals are set to 0.

Meanwhile, when the residual signal is present (tu_cbf_luma is true), transform_skip_flag indicating whether the transform is skipped may be decoded. Here, when transform_skip_flag has not been transmitted, transform_skip_flag is inferred as having the same value as the flag indicating application or non-application of the differential coding. In other words, as described above, since the differential coding technique is applied under the transform skip mode, transform_skip_flag is not included in the bitstream. When differential coding is applied, transform_skip_flag may be automatically set to true ('1') so that the transform can be skipped.

When the explicit differential coding technique is applied, the video decoding apparatus may use the decoded direction information to generate the residual block from the residual signals reconstructed from the bitstream. Equation 3 is used in the case of horizontal differential coding and Equation 4 is used in the case of vertical differential coding.

The video decoding apparatus inverse quantizes the residual block (S630).

The video decoding apparatus generates the prediction block of the current block through intra prediction (S640). The video decoding apparatus may generate the prediction block of the current block by using sub-steps S642 and S644.

The video decoding apparatus sets the intra prediction mode of the current block by using the differential coding information (S642).

When the differential coding technique is applied, the video decoding apparatus may set the intra prediction mode by using direction information among the decoded information on differential coding. In particular, in the case of horizontal differential coding, the intra prediction mode is set to the horizontal intra prediction mode (e.g., INTRA_ANGULAR18 in FIGS. 3A and 3B), and in the case of vertical differential coding, the intra prediction mode is set to the vertical intra prediction mode (e.g., INTRA_ANGULAR50 in FIGS. 3A and 3B).

The video decoding apparatus predicts the current block by using the previously reconstructed pixels around the current block according to the intra prediction mode (S644).

The video decoding apparatus reconstructs the current block by adding the prediction block to the inverse quantized residual block (S650).

Since the differential coding technique is applied under the transform skip mode, the video decoding apparatus skips the inverse transform of the inverse quantized residual block. Accordingly, the video decoding apparatus may reconstruct the current block by adding the inverse quantized residual block and the intra prediction block of the current block. When intra-predicting a subsequent block to be decoded, pixels in the reconstructed current block may be used as reference pixels.

To remove a blocking artifact caused by block-by-block decoding, the video decoding apparatus performs the deblock-filtering on the boundary between the adjacent block neighboring the reconstructed current block and the reconstructed current block. However, when both the residual block of the adjacent block and the residual block of the current block has been differentially encoded, the video decoding apparatus may skip the deblock-filtering on the boundary between the adjacent block and the current block.

FIG. 7 is a flowchart of a video decoding method for decoding a block encoded through the inter prediction, using an explicit differential coding technique according to at least one embodiment of the present disclosure.

The video decoding apparatus decodes, from the bitstream, information on differential coding applied to the residual block of the current block (S710).

The information on differential coding may include a flag for indicating application or non-application of the differential coding and a flag for indicating the differential coding direction. The video decoding apparatus may decode information on the differential coding applied to the residual block of the current block. The differential coding information may be transmitted to the video decoding apparatus as a syntax element of diff_cod_idx as shown in Table 2.

The video decoding apparatus reconstructs information on the residual signal from the bitstream and generates the residual block by using the information on the residual signal and the differential coding information (S720).

The video decoding apparatus generates residual signals by first reconstructing the transmitted information on the residual signals. Since the specific method is the same as that described with reference to FIG. 6, further description thereof will be omitted.

When the explicit differential coding technique is applied, the video decoding apparatus may use the decoded direction information to generate the residual block from the residual signals reconstructed from the bitstream. Equation 3 is used in the case of horizontal differential coding and Equation 4 is used in the case of vertical differential coding.

The video decoding apparatus inverse quantizes the residual block (S730).

The video decoding apparatus generates a prediction block of the current block through inter-prediction (S740). The video decoding apparatus may generate the prediction block of the current block by using sub-steps S742 and S744.

The video decoding apparatus utilizes the syntax element of an extracted inter prediction mode to determine a motion vector of the current block and a reference picture referred to by the motion vector (S742).

The video decoding apparatus predicts the current block by using the motion vector and the reference picture (S744).

The video decoding apparatus reconstructs the current block by adding the prediction block to the inverse quantized residual block (S750).

Since the differential coding technique is applied under the transform skip mode, the video decoding apparatus skips the inverse transform of the inverse quantized residual block. Accordingly, the video decoding apparatus may reconstruct the current block by adding the inversely quantized residual block and the inter prediction block of the current block.

To remove a blocking artifact caused by block-by-block decoding, the video decoding apparatus may perform the deblock-filtering on the boundary between the adjacent block neighboring the reconstructed current block and the reconstructed current block. However, when both the residual block of the adjacent block and the residual block of the current block has been differentially encoded, the video decoding apparatus may skip perform the deblock-filtering on the boundary between the adjacent block and the current block. When all blocks in one picture are reconstructed, the reconstructed picture may be used as a reference picture for inter-predicting blocks in a next picture to be decoded.

Figure 8:
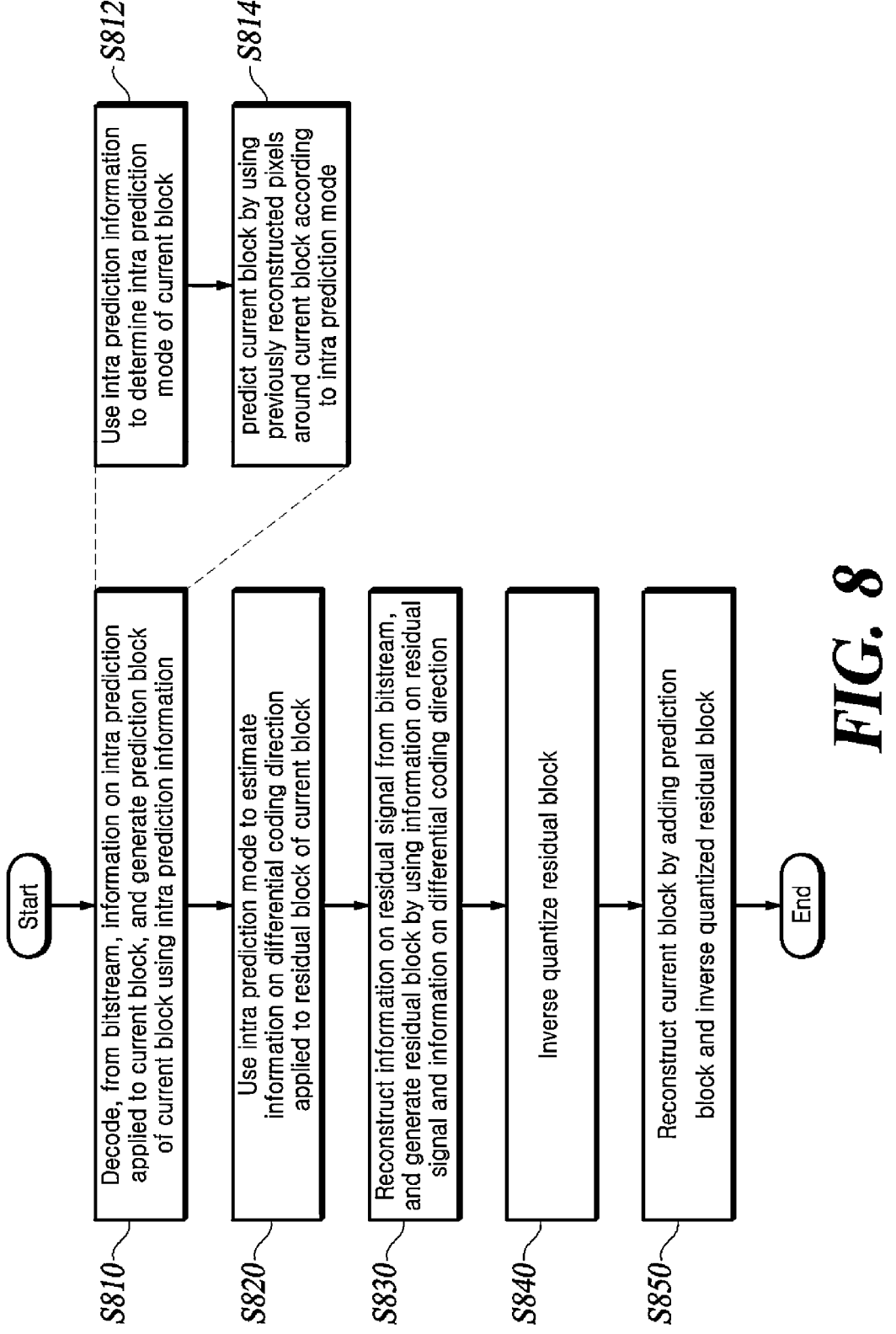
FIG. 8 is a flowchart of a video decoding method for an intra prediction-coded block, using an implicit differential coding technique according to another embodiment of the present disclosure.

FIG. 8 is a flowchart of a video decoding method for decoding a block encoded through the intra prediction, using an implicit differential coding technique according to another embodiment of the present disclosure.

The video decoding apparatus decodes information on intra prediction applied to the current block from a bitstream and uses the decoded intra prediction information to generate a prediction block of the current block (S810). The video decoding apparatus may generate the prediction block of the current block by using sub-steps S812 and S814.

The video decoding apparatus uses the decoded intra prediction information to determine the intra prediction mode of the current block (S812).

The video decoding apparatus may determine, using the syntax element of an extracted intra prediction mode, the intra prediction mode of the current block from among a plurality of intra prediction modes.

The video decoding apparatus predicts the current block by using previously reconstructed pixels around the current block according to the intra prediction mode (S814).

The video decoding apparatus uses the intra prediction mode to infer information on the differential coding direction applied to the residual block of the current block (S820).

When the implicit differential coding technique is applied, the required information on the differential coding is the differential coding direction. In the transform skip mode (transform_skip_flag being true), the video decoding apparatus may estimate prediction direction information of differential coding from intra prediction information. For example, when the intra prediction mode is directional mode No. 18, the horizontal differential coding may be applied to the residual block. Additionally, when the intra prediction mode is directional mode No. 50, the vertical differential coding may be applied to the residual block.

In another embodiment of the present disclosure, when the difference between the intra prediction mode and directional mode No. 18 is smaller than a preset threshold range as shown in Equation 5, the horizontal differential coding may be applied to the residual block. Additionally, when the difference between the intra prediction mode and directional mode No. 50 is smaller than a preset threshold range as shown in Equation 6, the vertical differential coding may be applied to the residual block.

The video decoding apparatus reconstructs information on the residual signal from the bitstream and generates the residual block by using the information on the residual signal and information on the differential coding direction (S830).

When the implicit differential coding technique is applied, the video decoding apparatus may use direction information estimated from the intra prediction mode to generate the residual block from the residual signals reconstructed from the bitstream. Equation 3 is used in the case of horizontal differential coding and Equation 4 is used in the case of vertical differential coding.

The video decoding apparatus inverse quantizes the residual block (S840).

The video decoding apparatus reconstructs the current block by adding the prediction block and the inverse quantized residual block (S850).

Since the differential coding technique is applied under the transform skip mode, the video decoding apparatus skips the inverse transform of the inverse quantized residual block. Accordingly, the video decoding apparatus may reconstruct the current block by adding the inverse quantized residual block and the intra prediction block of the current block. For future intra prediction of a next block to decode, pixels in the reconstructed current block may be used as reference pixels.

To remove a blocking artifact caused by block-by-block decoding, the video decoding apparatus may perform the deblock-filtering on the boundary between the adjacent block neighboring the reconstructed current block and the reconstructed current block. However, when both the residual block of the adjacent block and the residual block of the current block has been differentially encoded, the video decoding apparatus is exempted from performing the deblock-filtering on the boundary between the adjacent block and the current block.

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective drawings or by performing two or more of the steps in parallel, and hence the steps in the respective flowcharts are not limited to the illustrated chronological sequences.

Meanwhile, various methods or functions described in the present disclosure may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media such as erasable programmable read only memory (EPROM), flash drive, optical drive, magnetic hard drive, and solid state drive (SSD) among others.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A video decoding method for reconstructing a current block that is encoded using an intra prediction, the video decoding method comprising:
 decoding, from a bitstream, based on size of the current block and a high-level syntax encoded within a sequence parameter set of the bitstream, a flag indicating whether differential coding has been applied to a residual block of the current block;
 when the flag indicates that the differential coding has been applied to the residual block, decoding, from the bitstream, direction information indicating a direction of the differential coding applied to the residual block;
 generating the residual block by reconstructing information on residual signals from the bitstream;
 generating a modified residual block by modifying the residual signals in the residual block based on the direction information, wherein each target residual signal to be modified in the residual block is modified by being summed with one or more residual signals in the residual block that are arranged in a direction indicated by the direction information from the target residual signal;
 inversely quantizing the modified residual block into an inverse quantized residual block;
 inferring an intra prediction mode of the current block from the direction of the differential coding indicated by the direction information decoded from the bitstream, without decoding information on the intra prediction mode of the current block from the bitstream and without using information on an intra prediction mode of a neighboring block adjacent to the current block, and generating a prediction block for the current block by intra predicting the current block based on the inferred intra prediction mode; and
 reconstructing the current block by adding the prediction block and the inverse quantized residual block.

2. The video decoding method of claim 1, wherein the direction information indicates any one of a horizontal direction or a vertical direction.

3. The video decoding method of claim 2, wherein, when the direction information indicates the horizontal direction, the target residual signal is modified by being summed with left residual signals located leftward of the target residual signal on a same row as the target residual signal.

4. The video decoding method of claim 2, wherein, when the direction information indicates the vertical direction, the target residual signal is modified by being summed with upper residual signals located upwardly of the target residual signal on a same column as the target residual signal.

5. The video decoding method of claim 1, wherein the intra prediction mode of the current block is set to have a prediction direction that coincides with a direction indicated by the direction information.

6. The video decoding method of claim 1, wherein an inverse transform for the inverse quantized residual block is skipped.

7. The video decoding method of claim 1, wherein the information on the residual signals comprises:
 information indicating whether the residual signals exist; and
 information indicating whether a transform skip mode is used.

8. The video decoding method of claim 1, further comprising:
 deblock-filtering a boundary between the reconstructed current block and a reconstructed neighboring block adjacent to the reconstructed current block,
 wherein the deblock-filtering is not performed on the boundary between the reconstructed current block and the reconstructed neighboring block when the differential coding is applied to both a residual block of the reconstructed neighboring block and the residual block of the current block.

9. A method for transmitting a bitstream including encoded data of a current block, the method comprising:
 generating the bitstream by encoding a current block using an intra prediction; and
 transmitting the bitstream, wherein generating the bitstream comprises:
 encoding, into a sequence parameter set of a bitstream, a high-level syntax used to determine whether differential coding is allowed for a sequence including a picture containing the current block;
 when the differential coding is allowed for the sequence, determining, based on size of the current block, whether to apply the differential coding to a residual block of the current block;
 when the differential coding is applied to the residual block, determining a direction of the differential coding to be applied to the residual block of the current block;
 generating a prediction block of the current block by intra-predicting the current block based on an intra prediction mode of the current block which is equal to the direction of the differential coding, without using information on an intra prediction mode of a neighboring block adjacent to the current block;
 generating the residual block by subtracting the prediction block from the current block;
 generating a modified residual block by modifying residual signals in the residual block based on the direction of the differential coding, wherein each target residual signal to be modified in the residual block is modified by subtracting, from the target residual signal, a neighboring residual signal which is adjacent to the target residual signal in the direction of the differential coding; and encoding, into the bitstream, the modified residual block and information for indicating the direction of the differential coding, wherein information on the intra prediction mode of the current block is not encoded such that the intra prediction mode of the current block is inferred from the information for indicating the direction of the differential coding by a video decoding apparatus.

10. A video encoding method for encoding a current block using an intra prediction, the method comprising:

encoding, into a sequence parameter set of a bitstream, a high-level syntax used to determine whether differential coding is allowed for a sequence including a picture containing the current block;

when the differential coding is allowed for the sequence, determining, based on size of the current block, whether to apply the differential coding to a residual block of the current block;

when the differential coding is applied to the residual block, determining a direction of the differential coding to be applied to the residual block of the current block;

generating a prediction block of the current block by intra-predicting the current block based on an intra prediction mode of the current block which is equal to the direction of the differential coding, without using information on an intra prediction mode of a neighboring block adjacent to the current block;

generating the residual block by subtracting the prediction block from the current block;

generating a modified residual block by modifying residual signals in the residual block based on the direction of the differential coding, wherein each target residual signal to be modified in the residual block is modified by subtracting, from the target residual signal, a neighboring residual signal which is adjacent to the target residual signal in the direction of the differential coding; and encoding, into a bitstream, the modified residual block and information for indicating the direction of the differential coding, wherein information on the intra prediction mode of the current block is not encoded such that the intra prediction mode of the current block is inferred from the information for indicating the direction of the differential coding by a video decoding apparatus.

* * * * *